United States Patent Office 2,887,475
Patented May 19, 1959

2,887,475

ROSIN HAVING IMPROVED CHARACTERISTICS FOR USE IN SIZE AND ROSIN SIZING COMPOSITIONS PREPARED THEREFROM

Spencer H. Watkins, Wilmington, Del., assignor to Hercules Powder Company, Wilmington, Del., a corporation of Delaware No Drawing. Application December 18, 1956
Serial No. 628,962

4 Claims. (Cl. 260—105)

This invention relates to a process for treating rosin to improve its sizing, foaming, stability and brightness characteristics for use in size and to the preparation of rosin size compositions from the thus treated rosin.

Rosin has a pronounced tendency to oxidize contributed to largely by the abietic type acids present. The oxidation of rosin greatly reduces its sizing efficiency. Also because rosin is not stable to oxidation, paper sized with it colors on aging and hence is objectionable for many uses. Moreover, the oxidation of rosin in its handling and in its use in size and sizing, whether dry or paste size, causes increased foam on the paper machine, which makes operation of the paper machine and production of quality paper more difficult.

Various treatments of rosin have been resorted to in an effort to decrease its abietic acid content and thereby increase its resistance to oxidation. However, where such treatments are effective to provide the desired stabilization against oxidation of the rosin, they usually cause a decrease in its sizing efficiency which renders it uneconomical for most sizing uses.

It has now been found that if rosin is first subjected to a disproportionation treatment and then to a topping treatment in the manner hereinafter described, a product is obtained which, when used in the sizing of paper, has substantially increased resistance to oxidation and improved foaming, color and sizing characteristics as compared to rosin which has not been so treated.

In accordance with the invention, a rosin material, such as wood or gum rosin, is first subjected to a disproportionation treatment in the presence of a suitable catalyst until it contains less than about 5%, and preferably less than about 1%, of abietic acid, and preferably from about 20% to about 60% of dehydroabietic acid. It is then subjected to a topping treatment, preferably by distillation or fractionation at reduced pressure, under conditions such as to remove a major amount, and preferably substantially all of the material boiling below the resin acids. The resulting product is then saponified with alkali in the usual manner to form the improved rosin sizing compositions.

The amount of material boiling below the resin acids which should be removed by the topping treatment to accomplish the objectives of the invention will vary depending on factors such as the nature of the starting material, the amount of such material present, the conditions of treatment and so on. In general, at least about 60% of such material present should be removed, and desirably at least about 90% or more. Based on the weight of rosin material, the amount of these lower boiling constituents to be removed may vary from about 3% to about 15%.

The rosins and rosin sizes prepared in accordance with the process of the invention are characterized by a relatively low content of abietic acid, i.e., less than about 5% based on the weight of rosin, a dehydroabietic acid content which is preferably at least about 20%, based on the weight of rosin, and a relatively low content of material boiling below the resin acids, i.e., preferably less than about 3% based on the weight of rosin.

The general form and nature of the invention having been set forth and described, the following examples are presented in illustration but not in limitation of the invention.

EXAMPLES 1-3

60,000–65,000 parts of N wood rosin were subjected to a disproportionation treatment by heating to a temperature within the range of 250° C.–310° C. for 4–6 hours in the presence of 20 parts of a 5% palladium-on-carbon catalyst. An inert atmosphere was maintained over the molten rosin during the heating to prevent any reaction between the hot rosin and atmospheric oxygen. At the end of the heating period, the rosin was allowed to cool slightly and was then filtered from the catalyst.

Portions of the disproportionated rosin thus prepared were each subjected to a topping operation to remove varying amounts of material boiling below the resin acids. This topping operation was carried out batchwise in a spinning band column of approximately eleven theoretical plates at 1 mm. mercury pressure. The pot temperature was approximately 200° C.

The rosin prodccts, prepared as above, together with a portion of the N wood rosin which had not been disproportionated and topped, were then converted into sizes and evaluated for sizing efficiency, foam characteristics and paper brightness. The sizes were prepared and cooked in the usual manner by melting the rosin, adding sufficient water and caustic to give the desired solids and free rosin, and stirring until a smooth paste was obtained.

In determining foam characteristics, a dilute emulsion of each size was prepared, alum added to a pH of 4.5, and the mixture agitated with introduction of a constant volume of air for a definite period of time. At the end of this time the volume of foam was determined to give an indication of the foaminess of the size. Thus, the higher the volume the greater the foaminess.

In evaluating the sizes for sizing efficiency and brightness the following procedure was utilized. Bleached sulfite pulp was beaten to a Shopper Riegler freeness of 750±10 cc. at 4.5% pulp consistency. This pulp was diluted to 2.5% consistency with pH 7 water and the proper amount of size added as an aqueous dispersion containing 3% rosin size solids. Sufficient papermaker's alum (about 2% based on the dry stock) was then added to lower the pH of the slurry to 4.5. The stock was then diluted to 0.25% consistency with pH 4.5 water and sheets of paper made in a Noble and Wood handsheet machine at 0.025% consistency using recycle water for the latter dilution. The sheets were then pressed and dried and conditioned for 48 hours at 70° C., 50% relative humidity and tested for sizing and Hunter brightness.

The results are set forth in Table I below.

Table I

| Example No. | Material | Acid No. | Sapon. No. | Percent Abietic Type Acids | Dehydroabietic Acids | Bromine No. | Relative Foam, Vol. | Ink Resistance (Sec.), Hercules Photometer, 85% Reflectance | | | Paper Brightness | |
|---|---|---|---|---|---|---|---|---|---|---|---|---|
| | | | | | | | | 0.75% Size | 1.5% Size | 2.25% Size | Unaged | Aged |
| 1 | N Wood Rosin | 163 | 170 | 50 | 10 | 110-125 | 10 | 47 | 160 | 234 | 81.9 | 70.7 |
| 2 | Pd Disproportionated and Topped Rosin 5% Distilled. | 161 | 175 | <1 | 57 | 46 | 4 | 48 | 178 | 248 | 83.2 | 75.4 |
| 3 | Pd Disproportionated and Topped Rosin 10% Distilled. | 164 | 178 | <1 | 60 | 47 | 4 | 58 | 182 | 260 | 83.0 | 75.3 |

EXAMPLES 4 AND 5

Portions of a Raney nickel disproportionated wood rosin which had been topped by a continuous process using steam dilution were converted into sizes and evaluated for sizing efficiency, foam characteristics and paper brightness in the manner described in connection with Examples 1, 2 and 3. The results are set forth in Table II below.

Table II

| Example No. | Material | Acid No. | Sapon. No. | Percent Abietic Type Acids | Percent Dehydroabietic Acids | Bromine No. | Relative Foam, Vol. | Ink Resistance (Sec.), Hercules Photometer, 85% Reflectance | | | Paper Brightness | |
|---|---|---|---|---|---|---|---|---|---|---|---|---|
| | | | | | | | | 0.75% Size | 1.5% Size | 2.25% Size | Unaged | Aged |
| 4 | Raney Nickel Disproportionated and Topped Rosin 5% Distilled. | 161 | 168 | <1 | 20 | 66 | 2 | 88 | 240 | 312 | 83.5 | 75.7 |
| 5 | Raney Nickel Disproportionated and Topped Rosin 10% Distilled. | 165 | 172 | <1 | 20 | 66 | 2 | 106 | 258 | 308 | 83.4 | 75.4 |

The examples illustrate the improvements in foaming, sizing efficiency and brightness characteristics obtained when rosin is treated in accordance with the invention. The examples further illustrate that a greater increase in sizing efficiency is obtained when the amount of material removed by the topping operation is increased from 5% to 10%. This indicates the desirability of the preferred procedure of removing substantially all of the material boiling below the rosin acids. However, as illustrated, improvements are obtainable even at the lower percentages and hence the invention contemplates operation within the ranges hereinabove set forth.

The advantages of the invention are obtained by first disproportionating and then topping the rosin. Disproportion may be carried out by contacting rosin with an active disproportionation catalyst at an elevated temperature of from about 200° C. to about 310° C. for a period of time from about 15 minutes to 6 hours until the rosin contains less than about 5%, and preferably less than about 1%, of abietic acid and preferably at least about 20% of dehydroabietic acid. Suitable disproportionation catalysts for effecting this conversion are palladium, platinum, nickel, iodine, sulfur and the like. The catalyst may be supported on a carrier such as granular aluminum, fibrous asbestos or activated charcoal. The disproportionation with a palladium catalyst, for example, may be conducted either by a batchwise or continuous procedure. Thus, in a batchwise procedure, the rosin may be contacted with from about 0.03% to about 5% by weight, based on the weight of the rosin, of a catalyst consisting of from 1 to 5 parts palladium deposited on 100 parts activated charcoal. The rosin and the catalyst are heated together at about 200-300° C. for about 1 to 6 hours. In the continuous process, the molten rosin is flowed over the supported palladium catalyst at a temperature within the range of about 225° to about 300° C. for a period of time from about 15 minutes to about 1 hour.

The topping operation is preferably carried out in a fractionation column under reflux at a pressure from about 1 to about 100 mm. mercury absolute and at a temperature from about 190° C. to about 300° C. The fractionation may be carried on with or without the use of steam. If steam is used, it may be introduced as such or in the form of water introduced into the bottom of the reboiler at the base of the column. The amount of water or steam may vary from zero up to about 1.5 parts per part of rosin.

The contact time in the reboiler may vary from about 10 minutes to about 4 hours and will, in general, fall within the range of 0.5 to 1.25 hours. The reflux ratio may vary widely. However, for a fractionating column having from about 10 to about 40 theoretical plates, it will generally fall within the range from about 1 to 1 to about 30 to 1. The lower boiling constituents, i.e., the materials boiling below the resin acids, are continuously taken off at the top of the column and the topped rosin is continuously removed at the bottom of the reboiler.

While the above method of topping is preferred, topping may also be carried out by other methods including distillation, such as partial distillation with steam, solvent refining and so on. Whatever the method used, the important consideration is that the particular type and conditions of treatment utilized be such as to effect removal of at least about 60%, and preferably 90% or more of material boiling below the resin acids. The type and conditions of treatment should also be selected and controlled so as to avoid undue degradation of the rosin material.

The disproportionated and topped rosin material, prepared as hereinabove described, may be formed into size by saponification with alkalis in the usual or any well-known manner. Thus, in preparing liquid rosin sizes, the rosin may be heated with an aqueous solution of sodium or potassium carbonate at about 190-212° F. for about 6 hours. About 9-16% by weight of the carbonate, based on the weight of the rosin, will usually be employed. In the preparation of dry rosin size, the rosin may be reacted with from about 9% to about 12% of sodium or potassium hydroxide in the form of a relatively concentrated aqueous solution to produce the dry size directly. The dry size may also be produced by subjecting the liquid size, prepared as described above, or a paste size to evaporation on a drum drier or by spray-drying.

The rosin materials which may be advantageously treated as herein described include any of the various types of rosins which are useful in the preparation of size such as wood rosins, gum rosins, tall oil rosins and so on. These rosin materials may be, and preferably are, refined according to one or more of the several methods that are well known to those skilled in the art, for example, by treatment with selective solvents, with absorbents, by crystallization and the like. Hence the terms "rosin" and/or "rosin materials," as utilized herein, are intended to cover these or equivalent materials.

The improvements in nonfortified size shown by the use of rosin materials treated as herein described are also obtainable with fortified sizes such as those made from rosin reacted with compounds such as maleic acid, fumaric acid, itaconic acid and citraconic acid, as well as the anhydrides of such acids. In the preparation of these fortified disproportionated and topped rosins, the disproportionation can be carried out so that sufficient abietic acid is left in the rosin for reaction with the maleic anhydride, fumaric acid and so on, or the treated rosin can be blended with a concentrated adduct prepared from a gum, wood or tall oil rosin.

It will thus be seen that the present invention provides an improved process of treating rosin to improve its properties for use in sizing paper. While a preferred embodiment of the invention is described herein, the invention is not to be construed as limited to the specific details described except as they are included in the following claims.

What I claim and desire to protect by Letters Patent is:

1. The process which comprises subjecting rosin to a disproportionation treatment until it contains less than about 5% abietic acid, subjecting the resulting disproportionated rosin to distillation under reduced pressure to separate the same into a low-boiling fraction consisting of from about 3-15% by weight of the rosin and a residual fraction consisting of the undistilled residue remaining after the low-boiling fraction has been removed, and reacting the residual fraction with an alkali to form an improved sizing composition.

2. The process of claim 1 wherein the disproportionation treatment is carried out in the presence of a catalyst selected from a group consisting of palladium, platinum, nickel, iodine and sulfur at a temperature from about 200° C. to about 310° C.

3. The process of claim 2 in which the catalyst is Raney nickel.

4. A rosin size composition produced in accordance with the process of claim 2.

References Cited in the file of this patent

UNITED STATES PATENTS

| | | |
|---|---|---|
| 2,249,766 | Humphrey | July 22, 1941 |
| 2,434,656 | Humphrey | Jan. 20, 1948 |
| 2,503,238 | Gayer | Apr. 11, 1950 |

OTHER REFERENCES

Harris: Rosin and Rosin Derivatives, December 1953 (reprinted from Encyclopedia of Chemical Technology, vol. 11, pp. 779–810).